United States Patent [19]
Brixner

[11] 3,844,967
[45] Oct. 29, 1974

[54] FERROELASTIC MATERIALS
[75] Inventor: Lothar H. Brixner, West Chester, Pa.
[73] Assignee: E. I. du Pont de Nemours and Company, Wilmington, Del.
[22] Filed: Oct. 27, 1972
[21] Appl. No.: 301,538

[52] U.S. Cl. .............................. 252/62.9, 252/300
[51] Int. Cl............................................ C04b 35/00
[58] Field of Search ........... 423/305, 306; 252/62.9, 252/300

[56] References Cited
OTHER PUBLICATIONS
Chemical Abstracts, Vol. 71, 1969, 56134e.

Primary Examiner—Oscar R. Vertz
Assistant Examiner—Gregory A. Heller

[57] ABSTRACT

Compositions of the formula $$Pb_{3-x}Sr_x(PO_4)_2$$

wherein $x = 0.01$ to 0.8 can be made by heating the stoichiometric amounts of ammonium phosphate, lead carbonate and strontium carbonate. The compositions can be grown in the form of single crystals which have ferroelastic properties (Aizu species $\overline{3}mF2/m$ and which can be used in mechanically actuated optical switches and the like.

4 Claims, No Drawings

FERROELASTIC MATERIALS

FIELD OF THE INVENTION

This invention relates to novel lead strontium phosphates and single crystals thereof.

BACKGROUND OF THE INVENTION

Ferroelastic materials exhibit spontaneous strain and a stress-strain curve which exhibits a hysteresis loop similar to the curve of magnetization versus field in the case of ferromagnetic materials. Like ferromagnetic materials, ferroelastic substances exhibit a Curie temperature above which the ferroelastic properties disappear, and a domain structure. The domain walls, which divide adjacent domains, are confined to certain crystallographic planes and are highly planar. Switching in response to stress occurs mainly by lateral motion of the domain walls.

The phenomenon of ferroelasticity was first clearly recognized by K. Aizu., J. Phys. Soc. Japan 27, 1969, who showed that the existence of ferroelasticity could be predicted from a knowledge of the crystal symmetry of the ferroelastic phase and the crystal symmetry of a prototypic paraelastic phase, generally the phase occurring above the Curie temperature. Similarly the existence of ferroelectric properties can be correlated with crystal symmetry. Both ferroelectric and ferroelastic properties can exist simultaneously in the same crystal, and in certain instances can be "coupled," i.e., the ferroelastic and ferroelectric domains are coextensive and the crystal can be "switched" by either mechanical stress or electrical stress, moreover both ferroelectric and ferroelastic properties disappear at a single Curie temperature.

The paraelastic phase is of higher symmetry than the ferroelastic phase, the crystal symmetry group of the ferroelastic phase being a subgroup of the paraelastic phase. Again, the same is true of ferroelectric art prototype paraelectric phases. L. A. Shuvalov, J. Phys. Soc. Japan 28, 38 (1970) has shown that in the case of ferroelectrics, symmetry consideration can be employed to determine the possible domain structure. Similar consideration can be employed to characterize ferroelastic domains.

Many ferroelastic materials are of lower symmetry than cubic, and exhibit optical birefringence. Because the domains correspond to a change in strain state, switching the ferroelastic crystal will change the optical properties. This property has been utilized heretofore in crystals exhibiting both ferroelectric and ferroelastic properties to construct optical switches and the like. In particular, gadolinium molybdate single crystals which exhibit coupled ferroelectric/ferroelastic properties below the Curie temperature of 159°C have been employed for this purpose as described in U.S. Pat. Nos. 3,602,904; 3,539,185 and 3,586,185.

The use of crystals having pure ferroelastic properties is advantageous in that switching can be accomplished by mechanical stress, and electrodes are not needed. When ferroelectric properties are present, electrodes must be provided on the surface of the crystal and charge transferred between the electrodes to neutralize the change in virtual charge on switching the direction of spontaneous polarization. Such electrodes are often required on the faces of the crystal through which light passes and hence detract from the optical properties of the crystal.

Heretofore few pure ferroelastics had been identified. Aizu has described vanadium dioxide ferroelastic below the phase transition at 70°C. The material in the ferroelastic state is, however, a semiconductor and highly absorbing in the visible region of the spectrum. Potassium dihydrogen phosphate is also believed to be ferroelastic but not ferroelectric (Aizu species $\overline{4}2mF222$) below the phase transition at $-125°C$.

Recently, in our laboratory we have recognized that the known compound $\alpha\text{-Pb}_3(PO_4)_2$ is a pure ferroelastic with a convenient Curie temperature of 179°C (Aizu species $\overline{3}mF2/m$) which is non-hygroscopic and transparent from $0.28\mu$ to $5\mu$.

DESCRIPTION OF THE INVENTION

The present invention is directed to novel compositions particularly in the form of single crystals, having the formula

$$Pb_{3-x}Sr_x(PO_4)_2$$

wherein $x$ is 0.01 to 0.8, and preferably from 0.6 to 0.8, characterized by
1. the properties of pure ferroelasticity
2. a rhombohedral structure with space group $R\overline{3}m$ above the Curie temperature and a monoclinic structure, space group C 2/c below the Curie temperature.

The novel composition of the present invention can be made by heating the constituent components to the melting temperature, between about 1,000° and 1,150°C preferably after an initial prefiring at about 250° to 500°C to remove volatiles. Thus the compound $Pb_{2.4}Sr_{0.6}(PO_4)_3$ can be prepared by prefiring 2.40 moles of $PbCO_3$, 0.60 mole of $SrCO_3$ and 2 mols of ammonium hydrogen phosphate to drive off ammonia and water, followed by fusion.

The detailed preparation of the novel compounds is shown in the following specific embodiments of the invention.

SPECIFIC EMBODIMENTS

The following specific embodiments are given to illustrate the manufacture and properties of some of the new compounds of the present invention.

EXAMPLE 1

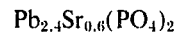

$Pb_{2.4}Sr_{0.6}(PO_4)_2$ 10.000 Gm of $PbCO_3$, 1.380 gm of $SrCO_3$ and 4.298 gm of $(NH_4)_2HPO_4$ were mixed and prefired at 300°C for 14 hours to remove all $NH_3$ and $H_2O$. This prefired mixture was then gradually heated to a temperature of 1,150°C when a homogeneous melt was obtained. The product obtained was then cooled and examined with x-rays. The x-ray spectra showed that none of the original components were present. The x-ray lines could be indexed on the basis of a monoclinic cell, space group C 2/c with $a = 13.817$ A, $b = 5.606$ A, $c = 9.471$ A and $\beta = 102.64°$. Above 170°, the Curie temperature, the material has hexagonal $R\overline{3}m$ symmetry.

EXAMPLES 2–7

Examples 2–7 employed essentially the same techniques employed for Example 1. Table II gives the quantities of materials, together with unit cell dimensions and the Curie temperature for certain of the components.

TABLE I

SYNTHESIS AND UNIT CELL DIMENSION OF $Pb_{3-x}Sr_x(PO_4)_2$

| EXAMPLE | x | g. $PbCO_3$ | g. $SrCO_3$ | g. $(NH_4)_2HPO_4$ | a, A | b, A | c, A | $\beta°$ | $T_c$ °C |
|---|---|---|---|---|---|---|---|---|---|
| 2 | 0.1 | 3.000 | 0.0573 | 1.0224 | | | | | |
| 3 | 0.2 | 3.000 | 0.1185 | 1.0590 | | | | | |
| 4 | 0.3 | 3.000 | 0.1842 | 1.0983 | | | | | |
| 5 | 0.5 | 3.000 | 0.3315 | 1.1862 | | | | | |
| 6 | 0.7 | 10.000 | 1.6820 | 4.2980 | 13.865 | 5.583 | 9.478 | 102.91 | 164 |
| 7 | 0.8 | 10.000 | 2.0110 | 4.4930 | 13.809 | 5.557 | 9.494 | 102.92 | 152 |

Single Crystals of the above materials can be prepared using the Czochralski technique.

Poling

Slices cut or cleaved from single crystals are generally multidomain in character, as is the case with lead phosphate single crystals. In order to utilize ferroelastic properties in devices it is essential that the crystals be transferred to a single domain condition. This process can be called "poling." One method of poling crystals having ferroelastic properties is to establish a temperature gradient in the crystal that has essentially linear isotherms such that only a selected portion of the crystal having parallel domain walls remains below the Curie temperature. The domain walls should be inclined at a steep angle to the Curie temperature isotherm but need not be perpendicular thereto. On cooling the crystal so that the isotherms retreat normally across the crystal, the domain walls extend into the material cooled sequentially below the Curie temperature, so that ultimately the essentially entire crystal is divided into domain walls having a parallel orientation. In some instances domain walls of undesired orientation may arise in the poling process, particularly when defects in the edges of the crystal occur. In such cases, it may be necessary to repeat the poling process, and in some instances with selection of a different set of domain walls. The above method of poling a ferroelastic crystal is described and claimed in the concurrently filed, commonly assigned application Ser. No. 301,540. Once the crystal has been poled so that the domain walls separating domains have been oriented to a single direction, the domain walls can be moved readily by the application of sheer stress across the domain walls so that excess domain walls can be removed by mutual annihilation or by exiting the crystal, until the desired configuration of domain walls within the crystal is obtained. A single domain wall can be retained in a predetermined region of the crystal, referred to as a switching region by cementing the rigid plates to the crystal at one or both ends thereof across which the domain walls must move to exit the plate as desrcibed in copending application Ser. No. 251,055 of John R. Barkley, now U.S. Pat No. 3,732,549. The clamping plates should have a straight edge defining the edge of the switching region and be cemented with an initially liquid hardenable cement which does not substantially shrink when hardened. Cements of the α-cyanoacrylate type are suitable. Care must be taken to obtain an even, straight cement line along the edge of the clamp defining the switching region. When two such clamps are employed to define a closed switching region thereby permanently trapping a domain wall, one clamp can be employed as a supporting member and the other clamp can be moved by applying a stress parallel to the domain wall and the edge of the clamp defining the switching region so that the domain wall can be moved as desired in the switching region.

Utility

The domains of the lead strontium phosphates of this invention are monoclinic in crystal structure and biaxially birefringent, the optic axes of adjacent domains lying in different directions in accordance with the differing directions of the crystal axes in such domains. Thus if a crystal divided into two domains by a domain wall is placed between appropriate polarizing and analyzing means so that light is extinguished by one of the domains, light is transmitted by the other domain. If means are provided to switch the crystal by mechanical stress, there are provided mechanically actuated optical switches which can be employed for display devices and the like.

The domain walls are highly planar and the properties of the crystal in the region of the domain wall differ from the adjacent domain in polarization of light and in causing the pattern of light transmitted by that region to diverge. Thus with appropriate polarization and/or spatial filtering techniques the light traversing the domain wall vicinity can be isolated from light traversing the adjacent domain, thereby providing mechanically actuated line scanners which can provide either a dark line image or a lighter field or vice versa.

Since obvious modifications and equivalents in the invention will be evident to those skilled in the arts, I propose to be bound solely by the appended claims.

The embodiments of the invention in which an exclusive property or privilege is claimed are defined as follows:

1. A composition having the formula $$Pb_{3-x}Sr_x(PO_4)_2 ,$$

wherein $x$ is from 0.01 to 0.8.

2. A composition of claim 1 in the form of a single crystal.

3. A composition of claim 1 wherein x is from 0.6 to 0.8.

4. A composition of claim 3 in the form of a single crystal.

* * * * *